United States Patent [19]

Boeckh et al.

[11] Patent Number: 4,980,088
[45] Date of Patent: Dec. 25, 1990

[54] DETERGENT COMPOSITIONS WITH COPOLYMERS OF 1,2-DIALKOXYETHYLENES AND MONOETHYLENICALLY UNSATURATED DICARBOXYLIC ANHYDRIDES

[75] Inventors: Dieter Boeckh, Limburgerhof; Hans-Peter Seelmann-Eggebert, Schriesheim; Heinrich Hartmann, Limburgerhof; Dieter Koeffer, Weinheim; Wolfgang Trieselt, Ludwigshafen; Alexander Kud, Eppelsheim; Richard Baur, Mutterstadt, all of Fed. Rep. of Germany

[73] Assignee: Basf Aktiengesellschaft, Ludwigshafen, Fed. Rep. of Germany

[21] Appl. No.: 447,409

[22] Filed: Dec. 7, 1989

[30] Foreign Application Priority Data

Jan. 5, 1989 [DE] Fed. Rep. of Germany ....... 3900207

[51] Int. Cl.$^5$ ............................ C02F 5/10; C02F 5/12; C08F 216/18; C11D 3/37
[52] U.S. Cl. ................................ 252/546; 252/174.25; 252/180; 252/DIG. 2; 252/DIG. 11; 524/159; 524/161; 524/376; 524/549; 525/327.6; 525/327.7; 525/327.8
[58] Field of Search .................... 252/174.25, 546, 180, 252/DIG. 2, DIG. 11; 524/549; 525/327.8, 327.7, 327.6

[56] References Cited

U.S. PATENT DOCUMENTS

| | | | |
|---|---|---|---|
| 3,308,067 | 3/1967 | Diehl | 252/550 |
| 3,905,907 | 9/1975 | Shiga | 252/79.4 |
| 4,088,493 | 5/1978 | Krafft | 96/77 |
| 4,306,991 | 12/1981 | Hwa | 252/180 |
| 4,559,159 | 12/1985 | Denzinger | 174.24/ |
| 4,608,188 | 8/1986 | Parker | 252/99 |
| 4,687,592 | 8/1987 | Collins | 252/99 |
| 4,844,744 | 7/1989 | Leiter | 134/40 |
| 4,919,845 | 4/1990 | Vogt | 252/526 |

FOREIGN PATENT DOCUMENTS 0025551 9/1982 European Pat. Off. .

OTHER PUBLICATIONS

Macromolecules, vol. 1, No. 6, Nov.-Dec. 1968, pp. 482–488, T. Kokubo et al., "Studies on the Charge–Transfer Complex and Polymerization, XVII, the Reactivity of the Charge-Transfer Complex in Alternating Radical Copolymerization of Vinyl Ethers and Maleic Anhy.".

Makromol. Chem. 1969, vol. 123, pp. 256-264, T. Kokubo et al., "Charge-Transfer Complex and Polymerization, XIX, Spontaneous Copolymerization of 1,2-Dimethoxyethylene and P-Dioxene with Maleic Anhydride".

Die Makromolekulare Chemie, 180, 1979, pp. 1125–1131, T. Hirano et al., "Polymeric Derivatives of Activated Cyclophosphamide as Drug Delivery Systems in Anitumor Chemotherapy".

Primary Examiner—Dennis Albrecht
Assistant Examiner—Erin M. Harriman
Attorney, Agent, or Firm—Oblon, Spivak, McClelland, Maier & Neustadt

[57] ABSTRACT

Pulverulent and liquid detergents contain (1) one or more anionic surfactants, one or more nonionic surfactants or mixtures thereof and (2) copolymers in amounts of from 0.1 to 15% by weight preparable by copolymerization of (a) from 10 to 55 mol % of a 1,2-di-$C_1$-$C_4$-alkoxyethylene,
(b) from 10 to 60 mol % of a monoethylenically unsaturated dicarboxylic anhydride of from 4 to 8 carbon atoms,
(c) from 0 to 60 mol % of a monoethylenically unsaturated $C_3$-$C_8$-monocarboxylic acid and
(d) from 0 to 20 mol % of another monoethylenically unsaturated monomer and subsequent hydrolysis of the anhydride groups of the copolymerized monomer (b) or reaction of these groups with an alcohol or an amine.

Preferred copolymers contain 1,2 dimethoxyethylene as the (a) monomer, maleic acid as the (b) monomer, and acrylic acid as the (c) monomer.

3 Claims, No Drawings

DETERGENT COMPOSITIONS WITH COPOLYMERS OF 1,2-DIALKOXYETHYLENES AND MONOETHYLENICALLY UNSATURATED DICARBOXYLIC ANHYDRIDES

Makromolekulare Chemie 180 (1979), 1125–1131, discloses copolymers of 1,2-dimethoxyethylene and maleic anhydride. These copolymers are used for example for preparing pharmaceutical slow-release formulations. EP-B-No. 0,025,551 discloses the use of copolymers of from 40 to 90% by weight of acrylic or methacrylic acid and from 60 to 10% of maleic acid, or of alkali metal or ammonium salts thereof, as incrustation inhibitors in washing powders. The copolymers are present in the washing powders in amounts of from 0.5 to 10% by weight. They are indeed very effective incrustation inhibitors, but they cannot be used to prepare stable detergent liquids because phase separation occurs within a relatively short time.

It is an object of the present invention to provide effective incrustation inhibitors which can be used not only in pulverulent but also in liquid detergent formulations.

We have found that this object is achieved by using a copolymer obtainable by copolymerization of (a) from 10 to 55 mol % of a 1,2-di-$C_1$-$C_4$-alkoxyethylene, (b) from 10 to 60 mol % of a monoethylenically unsaturated dicarboxylic anhydride of from 4 to 8 carbon atoms, (c) from 0 to 60 mol % of a monoethylenically unsaturated $C_3$-$C_8$-monocarboxylic acid and (d) from 0 to 20 mol % of another monoethylenically unsaturated monomer in an inert organic solvent in the presence of a polymerization inhibitor and subsequent hydrolysis of the anhydride groups of the copolymerized monomer (b) or reaction of these groups with an alcohol or an amine, as an additive in a pulverulent or liquid detergent composition in an amount of from 0.1 to 15% by weight. Preference is given to using a specific copolymer of this type which is obtainable by copolymerization of (a) 1,2-dimethoxyethylene with (b) a monoethylenically unsaturated dicarboxylic anhydride of from 4 to 8 carbon atoms. in a molar ratio of 1:1 and subsequent hydrolysis of the anhydride groups of copolymerized monomer (b).

Suitable monomers for use as component (a) for preparing the copolymer are 1,2-di-$C_1$-$C_4$-alkoxyethylenes such as 1,2-dimethoxyethylene, 1,2-diethoxyethylene, 1,2-di-n-propoxyethylene, 1,2-isopropoxyethylene and 1,2-n-butoxyethylene. The preferred component (a) is 1,2-dimethoxyethylene. The 1,2-dialkoxyethylenes can be used either in the form of the pure cis- or trans-isomers or else as cis,trans-isomer mixtures. The monomer of component (a) contributes from 10 to 55, preferably from 20 to 50, mol % to the copolymer.

A suitable component (b) for preparing the copolymer is a monoethylenically unsaturated dicarboxylic anhydride of from 4 to 8 carbon atoms, e.g. maleic anhydride, itaconic anhydride, mesaconic anhydride, citraconic anhydride or methylenemalonic anhydride. Of the anhydrides mentioned, maleic anhydride and itaconic anhydride are preferred, with maleic anhydride being of particular importance in practice. If the monomers of components (a) and (b) are copolymerized in the absence of other monomers, the copolymer formed is an alternating copolymer which contains said monomers as copolymerized units in a molar ratio of 1:1.

However, the properties of the copolymer can also be modified by performing the copolymerization in the presence of a monomer of group (c). The monomer of group (c) is a monoethylenically unsaturated $C_3$-$C_8$-monocarboxylic acid, e.g. acrylic acid, methacrylic acid, vinylacetic acid, allylacetic acid, propylideneacetic acid, ethylideneacetic acid, crotonic acid, $\alpha,\beta$-ethylacrylic acid or $\alpha,\beta$-dimethylacrylic acid. The preferred monomers in this group are acrylic acid and methacrylic acid. The monomer of group (c) may contribute up to 60 mol % to the copolymer. If a monomer of group (c) is used in the copolymerization, or terpolymerization, preference is given to preparing a terpolymer which contains as characteristic monomers from 20 to 50 mol % of a 1,2-di-$C_1$-$C_4$alkoxyethylene, (b) from 20 to 55 mol % of a monoethylenically unsaturated dicarboxylic anhydride of from 4 to 8 carbon atoms and (c) from 0.5 to 60 mol % of a monoethylenically unsaturated $C_3$-$C_8$-monocarboxylic acid as copolymerized units, and has a K value of from 10 to 80 (determined by the method of H. Fikentscher in dimethylformamide at a polymer concentration of 1% by weight).

The copolymer can be further modified by preparing it in the presence of a monomer of group (d). This group comprises monoethylenically unsaturated monomers other than those of groups (a), (b) and (c). Monomers which qualify are for example acrylamide, methacrylamide, dimethylaminoethyl acrylate, dimethylaminoethyl methacrylate, diethylaminoethyl acrylate, diethylaminoethyl methacrylate, acrylonitrile, methacrylonitrile, acrolein, methacrolein, vinyl esters of $C_1$-$C_{20}$-saturated alcohols, in particular vinyl acetate and vinyl propionate, alkyl vinyl ethers with $C_1$-$C_4$-alkyl groups, e.g. methyl vinyl ether, ethyl vinyl ether, n-propyl vinyl ether and isobutyl vinyl ether, methacrylic and acrylic esters of $C_1$-$C_8$-alcohols, e.g. methyl acrylate, ethyl acrylate, n-propyl acrylate, isopropyl acrylate, 2-ethylhexyl acrylate, 2-ethylhexyl methacrylate, methyl methacrylate, ethyl methacrylate, n-propyl methacrylate, isopropyl methacrylate and isobutyl methacrylate, N-vinylpyrrolidone, N-vinylamides, such as N-vinylformamide, N-vinylacetamide, N-vinylimidazole, N-vinylimidazoline and N-vinyl-2-methylimidazoline. The basic monomers can be used in the copolymerization in the form of the free bases or in neutralized or quaternized form. The monomer of group (d) contributes from 0 to 20 mol % to the copolymer.

The copolymerization is carried out in an inert organic solvent, inert in the sense that there is substantially no interference from it in the polymerization and that it does not react with the monomers. Solvents of this type are for example C such as acetone, diethyl ketone, methyl ethyl ketone and cyclohexanone, ethers, such as tetrahydrofuran and dioxane, esters of saturated acids and saturated monohydric $C_1$-$C_4$alcohols, such as methyl acetate, ethyl acetate, isopropyl acetate, methyl propionate, ethyl propionate, isobutyl propionate, methyl butyrate, ethyl butyrate and isobutyl butyrate, aromatic hydrocarbons, such as benzene, toluene, xylene and cumene, aliphatic hydrocarbons, such as pentane, hexane, heptane, octane, isooctane, cyclohexane, methylcyclohexane, dimethylcyclohexane, ethylcyclohexane and diethylcyclohexane, halogenated aliphatic hydrocarbons such as methylene chloride, dichloroethane, trichloroethane and tetrachloroethane, and also carbon dioxide. If the polymerization is carried out in carbon dioxide, it is carried out at above 31° C. in supercritical carbon dioxide. The preferred solvents are acetone, methyl ethyl ketone, tetrahydrofuran, dioxane, toluene and xylene. The polymerization may of course also be carried out in a mixture of inert solvents which do not react with the anhydride groups on monomer or polymer.

The copolymerization is carried out in the presence of a compound which decomposes into free radicals under the polymerization conditions. Suitable polymerization initiators are for example hydrogen peroxide, organic peroxides and hydroperoxides, peroxodisulfates, and redox initiators. The polymerization can also be carried out by the agency of high-energy radiation or by irradiating the reaction mixture in the presence of a photoinitiator, for example benzoin.

The initiator should preferably have a half-life of $<3$ hours at the chosen polymerization temperature. If, for example, the polymerization is started at a low temperature and completed at a high temperature, it is advisable to use 2 or more initiators. For the polymerization temperatures mentioned, it is possible to use for example the following initiators:

Temperature 50°-60° C.:
acetylcyclohexanesulfonyl peroxide, dicetyl peroxydicarbonate, dicyclohexyl peroxydicarbonate, di-2-ethylhexyl peroxydicarbonate, tert-butyl perneodecanoate,
2,2'-azobis(4-methoxy-2,4-dimethylvaleronitrile)

Temperature 70°-80° C.:
tert-butyl perpivalate, dioctanoyl peroxide, dilauroyl peroxide, 2,2,-azobis(2,4-dimethylvaleronitrile)

Temperature 90°-100° C.:
tert-butyl per-2-ethylhexanoate

Temperature 110°-120° C.:
bis(tert-butylperoxy)cyclohexane, tert-butyl peroxyisopropylcarbonate, tert-butyl peracetate Temperature 130°-140° C.:
2,2-bis(tert-butylperoxy)butane, dicumyl peroxide, di-tert-amyl peroxide, di-tert-butyl peroxide Temperature 150° C.:
p-menthane hydroper-oxide, pinane hydroper-oxide, cumene hydroperoxide, tert-butyl hydroperoxide.

By using redox coinitiators, for example benzoin or dimethylaniline, and also organically soluble complexes or salts of heavy metals, such as copper, cobalt, manganese, iron, nickel or chromium, it is possible to reduce the half-lives of the peroxides mentioned, in particular the hydroperoxides, so that for example tert-butyl hydroperoxide in the presence of 5 ppm of copper(II) acetylacetonate works at as low as 100° C.

The free radical polymerization initiators are used in customary amounts, for example from 0.1 to 5% by weight, based on the amount of monomer used in the polymerization.

The copolymerization can be carried out in the presence or absence of customary re.gulators, for example thio and mercapto compounds, e.g. mercaptoethanol, mercaptopropanol, mercaptobutanol, mercaptoacetic acid, mercaptopropionic acid, thiolactic acid, n-butylmercaptan, tert-butylmercaptan, octylmercaptan or dodecylmercaptan. Further suitable regulators are aldehydes, such as acetaldehyde, propionaldehyde or butyraldehyde, and also formic acid. The regulator, if used at all in the polymerization, is used in an amount of from 0.01 to 2%.

The copolymerization can also be carried out in the presence or absence of crosslinking agents. Suitable crosslinking agents are for example ethylene glycol divinyl ether, ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, 1,6-hexanediol dimethacrylate, neopentylglycol diacrylate, neopentylglycol dimethacrylate and the acrylic or methacrylic esters of alcohols of more than 2 hyroxyl groups, e.g. trimethylolpropane triacrylate and trimethylolpropane trimethacrylate. It is also possible to use diacrylates and dimethacrylates of polyethylene glycols or polypropylene glycols having molecular weights which are preferably within the range from about 400 to 2000. Equally, the di-maleates, trimaleates and (meth)acrylate maleates corresponding to the aforementioned di- and tri(meth)acrylates can also be used as crosslinking agents. If the copolymerization is carried out in the presence of a crosslinking agent, the amount of crosslinking agent is from 0.1 to 2.5% by weight, based on the total amount of monomer used in the copolymerization.

The polymerization is preferably carried out in a stirred kettle equipped for example with a horseshoe, vane or impeller stirrer. The copolymerization can be carried out for example as a solution, precipitation or suspension polymerization. In the case of a precipitation or suspension polymerization it can be advantageous to polymerize in the additional presence of a protective colloid. Suitable protective colloids are for example copolymers of maleic anhydride with vinyl alkyl ethers which contain from 1 to 20 carbon atoms in the alkyl group, or copolymers of maleic anhydride and olefins of from 8 to 20 carbon atoms and monoesters thereof with $C_{10}$-$C_{20}$-alcohols or monoamides thereof with $C_{10}$-$C_{20}$-amines. It is also possible to use polyalkyl vinyl ethers whose alkyl groups contain from 1 to 20 carbon atoms, e.g. polymethyl, polyethyl or polyisobutyl vinyl ether. If a protective colloid is used in the copolymerization, an effective amount is from 0.05 to 4% by weight, based on the monomers to be polymerized.

The concentration of monomer in the inert organic solvent is from 5 to 70, preferably from 15 to 50,% by weight. The inert organic solvent used can also be the particular monomer of group (a) used in the copolymerization. After the copolymerization has ended, the anhydride groups of the copolymerized monomer (b) are hydrolyzed or reacted with an alcohol or an amine. If subjected to a hydrolysis, ie. to the action of water, the anhydride groups of the copolymerization product are converted into carboxyl groups or the salts thereof, if the hydrolysis is carried out with an aqueous base. The anhydride groups of the copolymer can be converted in the same organic solvent in which the copolymerization was carried out. Or the solvent used is distilled off first before the anhydride groups are hydrolyzed or reacted with an alcohol or an amine. The aqueous solution of a carboxyl-containing copolymer obtained in the course of the hydrolysis can be used directly as a detergent additive. If the copolymer in the form of a free acid should not be sufficiently soluble in water, it can be used in a partially or completely neutralized form, into which it is preferably converted with sodium hydroxide solution, potassium hydroxide solution, ammonia or an alkanolamine, e.g. ethanolamine, diethanolamine, triethanolamine or a mixture thereof. The copolymer is water-soluble, at least in neutralized form, and has a K value of from 10 to 100 (determined at pH 7 on the sodium by weight).

However, the anhydrido-containing copolymers can also be partially esterified with an alcohol in a reaction where one anhydride group in the polymer gives rise to both a carboxyl and an ester group. Suitable alcohols are for example $C_1$–$C_{30}$-alcohols or, particularly advantageously, those OH-containing compounds which are preparable by reacting (A) $C_1$–$C_{30}$-alcohols, $C_8$–$C_{22}$-fatty acids, $C_1$–$C_{12}$-alkylphenols, secondary $C_2$–$C_{30}$-amines or mixtures thereof with (B) one or more $C_2$–$C_4$-alkylene oxides in a molar ratio of (A):(B) of from 1:2 to 1:50.

Suitable compounds (A) are $C_1$–$C_{30}$-alcohols, e.g. methanol, ethanol, n-propanol, isopropanol, n-butanol, isobutanol, tert-butanol, pentanol, cyclohexanol, n-hexanol, n-octanol, 2-ethylhexanol, decanol, dodecanol and stearyl alcohol. Of particular industrial importance are the oxo process alcohols, e.g. $C_{10}$-alcohols, $C_{13}$-alcohols and $C_{13}/C_{15}$-alcohols, and also natural alcohols, e.g. $C_{16}/C_{18}$-tallow fat alcohols. The oxo process alcohols and natural alcohols are in general mixtures of more than one alcohol.

Suitable compounds (A) also include $C_8$–$C_{22}$-fatty acids, e.g. stearic acid, palmitic acid, coconut acid, tallow acid and lauric acid. Component (A) may also be a $C_1$–$C_{12}$-alkylphenol, e.g. n-decylphenol, n-nonylphenol, isononylphenol, n-octylphenol, isobutylphenol or methylphenol. Component (A) may further be a secondary $C_2$–$C_{30}$-amine, e.g. dimethylamine, di-n-butylamine, di-n-octylamine and distearylamine. Preference is given to using secondary $C_8$–$C_{18}$-fatty amine. The preferred component (A) is a $C_1$–$C_{30}$-alcohol or a secondary $C_2$–$C_{18}$-amine.

A suitable component is a $C_2$–$C_4$-alkylene oxide, e.g. ethylene oxide, propylene oxide, n-butylene oxide or isobutylene oxide. It is also possible to use tetrahydrofuran as component (B). The preferred compounds for use as component (B) are ethylene oxide and propylene oxide. Ethylene oxide and propylene oxide may be added to the compound indicated under (A) either alone or in the form of a mixed gas to form an adduct composed of random ethylene oxide and propylene oxide units, or else by adding first ethylene oxide and then propylene oxide to the compound mentioned under (A), or vice versa, or indeed by adding first ethylene oxide, then propylene oxide then again ethylene oxide to a compound (A) to form block copolymers. Techniques for the alkoxylation of compounds (A) are known.

A compound (A) is reacted with a compound (B) in a molar ratio of (A):(B) of from 1:2 to 1:50, preferably from 1:3 to 1:12. This reaction produces in all cases a reaction product where at least one end group is an OH group. The reaction product thus prepared from (A) and (B) is made to react with the above-described copolymer of monomers (a) to (d) to form a partially esterified copolymer. This reaction can be carried out in the presence of a solvent which is inert to carboxylic anhydride groups, e.g. acetone or tetrahydrofuran, but preferably is carried out in the presence of a solvent; that is the copolymer which contains dicarboxylic anhydride groups is reacted directly with the reaction product of (A) and (B). The amount of reactant used here is chosen in such a way that only partial esterification of the anhydride groups occurs. Based on the hydrolyzed partially esterified polymer, more than 5%, e.g. 5.5–50%, preferably 9–30%, of the carboxyl groups are esterified. The esterification itself is in general carried out at an elevated temperature, for example at from 50° to 200° C., preferably 80°–150° C., in the presence of a customary esterification catalyst. A particularly suitable catalyst is p-toluenesulfonic acid. The esterification reaction ends after about 0.5–20, preferably 1–10 hours. The partial esterification of the anhydrido-containing copolymer with the reaction product of (A) and (B) leads to a product which permits the preparation of particularly stable liquid detergent formulations. Such a product is also obtainable by reacting the anhydrido-containing copolymer with a long-chain primary amine, for example a $C_{10}$–$C_{22}$-alkylamine or an amine of the formula

where
$R^1$ is $C_8$–$C_{28}$-alkyl or

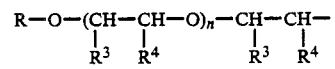

R is $C_1$–$C_{28}$-alkyl or H,
$R^3$ and $R^4$ are each H, $CH_3$ or $C_2H_5$,
n is from 2 to 100 and
$R^2$ is H or $R^1$.

The anhyrido groups of the copolymer are converted by this reaction into the corresponding half-amide groups.

Equally, the copolymer which contains alcoholated or aminated carboxyl groups can be partially or completely neutralized with one of the abovementioned bases. The copolymer can be used either in the form of the aqueous solution or else in the form of a powder. If the product to be used according to the present invention is to be used in a liquid detergent, it is preferable to start from an aqueous solution of the copolymer. Such a solution may of course also be used for preparing pulverulent detergents by drying said solution or by applying it to pulverulent constituents of the detergent formulation and then drying. Irrespective of whether formulated as a liquid or as a powder, the detergent formulation contains from 0.1 to 15, preferably from 0.5 to 10,% by weight of one or more copolymers of the above-described composition. The essential constituents of the detergent formulation are (1) one or more anionic surfactants, one or more non-ionic surfactants or a mixture thereof and
(2) a copolymer to be used according to the present invention.

It is possible to use a water-containing or a water-free liquid detergent which may be clear or cloudy. If the polymer according to the present invention is insoluble in the liquid detergent formulation, the copolymer may also be finely dispersed and stabilized if necessary with a dispersant. Suitable anionic surfactants in liquid detergents are for example sodium alkylbenzenesulfonates, fatty alcohol sulfates and fatty alcohol polyglycol ether sulfates. Individual compounds of this kind are for example $C_8$–$C_{12}$-alkylbenzenesulfonates, $C_{12}$–$C_{16}$-alkanesulfonates, $C_{12}$–$C_{16}$-alkyl sulfates, $C_{12}$–$C_{16}$-sulfosuccinates sulfated ethoxylated $C_{12}$–$C_{16}$-alkanols. Suitable anionic surfactants also include sulfated fatty acid alkanolamines, fatty acid monoglycerides or reaction products of from 1 to 4 moles of ethylene oxide with primary or secondary fatty alcohols or alkylphenols. Other suitable anionic surfactants are fatty acid esters or amides of hydroxy- or amino-carboxylic or -sulfonic acids, for example fatty acid sarcosides, glycolates, lactates, taurides or isethionates. The anionic surfactants may be present in the form of the sodium, potassium and ammonium salts and as soluble salts of organic bases, such as monoethanolamine, diethanolamine or triethanolamine or of other substituted amines. The anionic surfactants also include the soaps, ie. the alkali metal salts of natural fatty acids.

Usable nonionic surfactants, or nonionics for short, are for example addition products of from 3 to 40, preferably from 4 to 20, moles of ethylene oxide to 1 mole of fatty alcohol, alkylphenol, fatty acid, fatty amine, fatty acid amide or alkanesulfonamide. Of particular importance are the addition products of from 5 to 16 moles of ethylene oxide to coconut or tallow fatty alcohol, to oleyl alcohol or to synthetic alcohols of from 8 to 18, preferably from 12 to 18, carbon atoms, and also to mono- or dialkylphenols having from 6 to 14 carbon atoms in the alkyl moieties. However, besides these water-soluble nonionics it is also possible to use water-insoluble or partially water-soluble polyglycol ethers having from 1 to 4 ethylene glycol ether moieties in the molecule, in particular if used together with water-soluble nonionics or anionics.

Other useful nonionic surfactants are the water-soluble addition products of ethylene oxide to a polypropylene glycol ether, an alkylenediaminopolypropylene glycol or an alkylpolypropylene glycol having from 1 to 10 carbon atoms in the alkyl chain which contain from 20 to 250 ethylene glycol ether groups and from 10 to 100 propylene glycol ether groups and in which the polypropylene glycol ether chain acts as a hydrophobic moiety.

It is also possible to use nonionic surfactants of the type of the amine oxides or sulfoxides.

The foaming power of a surfactant can be increased or reduced by combining suitable surfactant types. A reduction is likewise possible by adding non-surfactant-like organic substances.

The liquid aqueous detergent contains from 4 to 50% by weight of surfactant. This may be an anionic or nonionic surfactant. However, it is also possible to use a mixture of anionic and nonionic surfactants. In such a case, the level of anionic surfactant in the liquid detergent is selected within the range from 0 to 50% by weight and the level of nonionic surfactant in the liquid detergent is selected within the range from 0 to 50% by weight, based on the total detergent formulation.

The liquid detergent may contain water in an amount of from 10 to 60, preferably from 20 to 50,% by weight. However, it can also be water-free.

The liquid detergent may also contain further, modifying ingredients. They include for example alcohols, such as ethanol, n-propanol and isopropanol, and also low molecular weight polyalkylene glycols such as di- and tri- and tetraethylene glycol and corresponding propylene glycols. These compounds, if they are used at all, are used in amounts of from 3 to 8% by weight, based on the total detergent formulation. Water-free liquid detergents may also contain a suspended or dispersed peroxo compound as a bleach. Suitable peroxo compounds are for example: sodium perborate, peroxocarboxylic acids and polymers with partly peroxo-containinq groups. The liquid detergent may also contain hydrotropes. These are compounds such as 1,2-propanediol, cumenesulfonate and toluenesulfonate. If such compounds are used for modifying the liquid detergent, their amount, based on the total amount of liquid detergent, is from 2 to 5% by weight. In many cases, the addition of a complexing agent has also proved suitable for modifying pulverulent and liquid detergents. Complexing agents are for example ethylenediaminetetraacetic acid, nitrilotriacetate and isoserinediacetic acid and also phosphonates such as aminotrismethylenephosphonic acid, hydroxyethanediphosphonic acid, ethylenediaminetetraethylenephosphonic acid and salts thereof. The complexing agents are used in amounts of from 0 to 10% by weight, based on the detergent. The detergent may also contain citrates, di- or triethanolamine, turbidifiers, fluorescent whitening agents, enzymes, perfume oils and dyes. These ingredients, if used for modifying the liquid detergent, together account for up to 5% by weight. The detergents are preferably phosphate-free. However, they may also contain phosphates, for example pentasodium triphosphate and/or tetrapotassium pyrophosphate. If phosphates are used, the phosphate content of the total formulation of the detergent is from 10 to 25% by weight. Pulverulent detergents can have different compositions:

Heavy duty or all-purpose household detergent powders for the drum type washing machines which are very common in Europe usually contain from 5 to 10% by weight of anionics; from 1 to 5% by weight of nonionics; from 1 to 5% by weight of foam re.gulators, such as silicone oils or soaps; from 0 to 40% by weight of water softeners, such as sodium carbonate or pentasodium triphosphate which may be wholly or partly replaced by the compound according to the present invention; from 0 to 30% by weight of ion exchange material, such as zeolite A; from 2 to 7% by weight of sodium silicates as corrosion inhibitors; from 10 to 30% by weight of bleaching agents, such as sodium perborate or sodium percarbonate; from 0 to 5% by weight of bleach activators, such as tetraacetylethylenediamine, pentaacetylglucose, hexaacetylsorbitol or acyloxybenzenesulfonate; stabilizers, such as magnesium silicate or ethylenediaminetetraacetate; grayness inhibitors, such as carboxy-methylcellulose, methylalkylcelluloses, hydroxyalkylcelluloses, vinyl acetate graft polyglycols, oligomeric and polymeric terephthalic/ethylene glycol/polyethylene glycol ester; enzymes; fluorescent whitening agents; scents; dyes and fillers. In contradistinction thereto, the heavy duty detergents used in the USA, Japan and neighboring countries in tub type washing machines are usually free of bleaching agents, but in return their level of anionics is two or three times as high, they contain more alkalis, such as sodium carbonate and sodium silicates (in general up to 25% by weight), and of course they contain no bleach activators or bleach stabilizers. The levels of surfactants and other ingredients can be still higher in the case of detergent concentrates which are commercially available with little or no filler. Powder specialty detergents for delicate and colored fabrics and woollens and for manual washing likewise usually do not contain any bleaching agents and have a low level of alkalis but an appropriately increased surfactant content.

Detergent powders for industrial laundries are tailored to the specific conditions of industrial washing (soft water, continuous washing) which make it possible to optimize the detergent to the type of fabric to be washed and its soiling. Use is therefore made of combinations in which one ingredient predominates or others are completely absent and are metered in separately as required. For this reason the levels of surfactants, builders, alkalis and bleaching agents in these detergents vary within wide limits. Suitable anionics and nonionics for detergent powders are the same as mentioned for liquid detergents.

In the Examples, the percentages are by weight. The K values were determined by the method of H. Fikentscher, Cellulosechemie, 13 (1932), 58–64, 71–74; $K = k \cdot 10^3$. The K values of hydrolyzed copolymers were measured in aqueous solution at 25° C., a pH of 7.0 and a polymer concentration of 2% by weight of the sodium salts of the copolymers.

COPOLYMER 1

A glass reactor equipped with a stirrer and three addition vessels is charged with 255 g of methyl ethyl ketone, 9.8 g of maleic anhydride and 9.0 g of 1,2-dimethoxyethylene, and the contents are heated to 80° C. under a stream of nitrogen. As soon as an internal temperature of 80° C. has been reached, a solution of 88.2 g of maleic anhydride in 135 g of methyl ethyl ketone is added over 2 hours together with 80.8 g of dimethoxyethylene and, starting at the same time but added over 2.5 hours, a solution of 4.96 g of tert-butyl perpivalate (75% strength in aliphatic hydrocarbon) in 50 g of methyl ethyl ketone. The mixture is subsequently reacted at 80° C. for 2 hours, and the solvent is distilled off at 65° C. and 100–500 mbar. 160.8 g of the copolymer obtained are dissolved in water at pH 6.5 with 50% strength aqueous sodium hydroxide solution. The copolymer salt is purified by precipitation with acetone and drying under reduced pressure at 75° C. The copolymer has a K value of 47.7.

COPOLYMER 2

The preparation of copolymer 1 is repeated, except that after the polymerization, water is added to the reaction mixture together with sufficient 50% strength aqueous sodium hydroxide solution as to set a pH of 6.5. The methyl ethyl ketone solvent is then distilled off at 65° C. and 100–500 mbar. The resulting aqueous solution of the sodium salt of the copolymer of 1,2-dimethoxyethylene and maleic anhydride has a solids content of 14.6%. The copolymer has a K value of 69.8. The residual level of unpolymerized maleic acid, based on the copolymer, is 0.04%.

EXAMPLE 1

COPOLYMER 3

A 1 liter capacity glass reactor equipped with a stirrer and four addition vessels is charged under nitrogen with 179 g of methyl ethyl ketone, 7.8 g of maleic anhydride, 3.6 g of 1,2-dimethoxyethylene and 2.9 g of acrylic acid, and the contents are heated with stirring to 80° C. Once a temperature of 80° C. has been, reached, a solution of 70.6 g of maleic anhydride in 108 g of methyl ethyl ketone is added at that temperature over 2 hours together with 32.3 g of 1,2-dimethoxyethylene and 25.9 g of acrylic acid and, starting at the same time as the addition of the monomers but added over 2.5 hours, a solution of 3.8 g of tert-butyl perpivalate. (75% strength in aliphatic hydrocarbon) in 50 g of methyl ethyl ketone. After the initiator has been added, the reaction mixture is stirred at 80° C. for 2 hours, and the solvent is then distilled off at 65° C. and 100–500 mbar. The product is then dissolved in water and neutralized at pH 6.5 with 50% strength aqueous sodium hydroxide solution. A mixture of equal parts by weight of methanol and acetone is added to precipitate the polysodium salt of the copolymer of 1,2-dimethoxyethylene, maleic acid and acrylic acid from the aqueous solution. It is filtered off and dried at 65° C. under reduced pressure. The copolymer has a K value of 36.2.

EXAMPLE 2

COPOLYMER 4

A 500 ml capacity glass reactor equipped with a stirrer and four addition vessels is charged under nitrogen with 142 g of methyl ethyl ketone, 2 g of maleic anhydride, 1.8 g of dimethoxyethylene and 4.3 g of acrylic acid and heated to 80° C. As soon as the reaction mixture has reached 80° C., a solution of 17.6 g of maleic anhydride in 30 g of methyl ethyl ketone is added over 2 hours together with 15.8 g of 1,2-dimethoxyethylene and 38.98 g of acrylic acid and, starting at the same time as the monomer additions but added over 2.5 hours, a solution of 1.1 g of tert-butyl perpivalate (75% strength in aliphatic hydrocarbon) in 20 g of methyl ethyl ketone. After the initiator has been added, the mixture is stirred, and polymerized, at 80° C. for 2 hours. The solution is then diluted with water and brought to pH 6.5 by the addition of 50% strength aqueous sodium hydroxide solution. Methyl ethyl ketone is subsequently distilled off at 65° C. and 100–500 mbar, leaving an aqueous solution of the sodium salt of a copolymer of 1,2-dimethoxyethylene, maleic acid and acrylic acid having a solids content of 19.3%. The K value of the copolymer is 50.7. The residual maleic acid content in the copolymer is 0.16%.

EXAMPLE 3

COPOLYMER 5

The preparation of copolymer 4 is repeated, except that the reactor is charged with 2.9 g of maleic anhydride, 2.6 g of 1,2-dimethoxyethylene, 2.9 g of acrylic acid and 139 g of methyl ethyl ketone and a solution of 26.5 g of maleic anhydride in 40.5 g of methyl ethyl ketone, 23.8 g of 1,2-dimethoxyethylene, 25.9 g of acrylic acid and a solution of 1.1 g of tertbutyl perpivalate (75% strength in aliphatic hydrocarbon) in 20 g of methyl ethyl ketone are metered in at 80° C. The result obtained is an aqueous solution of a polysodium salt of a copolymer having a solids content of 21%. The K value of the copolymer is 56.8. The copolymer contains 0.35% of maleic acid.

EXAMPLE 4

COPOLYMER 6

The preparation of copolymer 4 is repeated, except that the reactor is charged with 3.9 g of maleic anhydride, 3.5 g of 1,2-dimethoxyethylene, 1.4 g of acrylic acid and 133 g of methyl ethyl ketone, and a solution of 35.3 g of maleic anhydride in 57 g of methyl ethyl ketone is then metered in at the same time as 31.7 g of 1,2-dimethoxyethylene, 13 g of acrylic acid and 1.1 g of tert-butyl perpivalate (75% strength in aliphatic hydrocarbon) in 20 g of methyl ethyl ketone. The workup leaves a solution of the polysodium salt of a copolymer of 1,2-dimethoxyethylene, maleic acid and acrylic acid having a solids content of 20%. The K value of the copolymer is 51.7. The amount of residual maleic acid in the copolymer is found to be 0.19%.

COPOLYMER 7

Sodium salt of a copolymer of 70% of acrylic acid and 30% of maleic acid of K value 60 (incrustation inhibitor as described in EP-B-0,025,551).

APPLICATION EXAMPLES

To test the incrustation-inhibiting action of the above-described copolymers, each of the above-described copolymers was incorporated in two different washing powders A and B. These washing powder formulations were then used to wash two cotton test fabrics, one a plain weave the other a terry toweling weave. The number of wash cycles was 20. After this number of washes, the ash content of each fabric was determined by ashing it. The ash content is reported in % by weight. The lower the ash content of the test fabric, the greater the effectiveness of the copolymer in the detergent.

| Experimental conditions for determining incrustation: | |
|---|---|
| Apparatus: | Launder-O-Meter from Atlas, Chicago |
| Number of wash cycles: | 20 |
| Wash liquor: | 250 ml, the water used containing 4 mmol of hardness per liter (calcium:magnesium 4:1) |
| Washing time: | 30 minutes at 60° C. (including heating-up time) |
| Detergent dosage: | 8 g/l |
| Detergent A | |
| 12.5% of dodecylbenzenesulfonate (50%) | |
| 4.7% of C 13/C 15-oxo alcohol polyglycol ether (7 EO) | |
| 2.8% of soap | |
| 25% of zeolite A | |
| 4% of sodium disilicate | |
| 1% of magnesium silicate | |
| 20% of sodium perborate | |
| 14% of sodium sulfate | |
| 10% of copolymer | |
| remainder to 100%:sodium sulfate | |
| Detergent B | |
| 12.5% of dodecylbenzenesulfonate (50%) | |
| 4.7% of C 13/C 15-oxo alcohol polyglycol ether (7 EO) | |
| 2.8% of soap | |
| 10% of pentasodium triphosphate | |
| 24% of zeolite A | |
| 6% of Na disilicate | |
| 1% of Mg silicate | |
| 20% of sodium perborate | |
| 15% of sodium sulfate | |
| 3% of copolymer | |

| -continued | |
|---|---|
| Experimental conditions for determining incrustation: | |
| remainder to 100%:sodium sulfate | |

TABLE 1

| Ex. | Comparative Example | Detergent | Copolymer No. | % by weight ash content of test fabric | |
|---|---|---|---|---|---|
| | | | | Plain weave | Terry toweling |
| | 1 | 1 | — | 1.01 | 4.63 |
| | 2 | 1 | 7 | 0.65 | 2.77 |
| 5 | | 1 | 1 | 0.64 | 2.47 |
| 6 | | 1 | 3 | 0.52 | 2.64 |
| | 3 | 2 | — | 1.61 | 4.60 |
| | 4 | 2 | 7 | 0.55 | 0.53 |
| 7 | | 2 | 2 | 0.48 | 0.38 |
| 8 | | 2 | 4 | 0.48 | 0.53 |
| 9 | | 2 | 5 | 0.37 | 0.42 |
| 10 | | 2 | 6 | 0.51 | 0.47 |

We claim:

1. A liquid or pulverulent detergent formulation which contains as essential constituents
   (a) a detergent or cleaning effective amount of one or more anionic surfactants, one or more nonionic surfactants or a mixture thereof and
   (2) a copolymer in an amount of from 0.1 to 15% by weight which is preparable by copolymerization of
      (a) from 20 to 55 mol % of a, 1,2-di-$C_1$- $C_4$-alkoxyethylene,
      (b) from 10 to 60 mole % of a monoethylenically unsaturated dicarboxylic anhydride of from 4 to 8 carbon atoms,
      (c) from 0 to 60 mol % of a monoethylenically unsaturated $C_3$-$C_8$-monocarboxylic acid and
      (d) from 0 to 20 mol % of another monoethylenically unsaturated monomer
   is an inert organic solvent in the presence of a polymerization inhibitor and subsequent hydrolysis of the anhydride groups of the copolymerized monomer (b) or reaction of these groups with an alcohol or an amine, said copolymer having a K value of 10 to 100.

2. A liquid or pulverulent detergent formulation as claimed in claim 1, wherein the copolymer is obtainable by copolymerisation of
   (a) 1,2-dimethoxyethylene with
   (b) a monoethylenically unsaturated dicarboxylic anhydride of from 4 to 8 carbon atoms
   in a molar ratio of 1:1 and subsequent hydrolysis of the anhydride groups of the copolymerized monomer (b).

3. A liquid or pulverulent detergent formulation as claimed in claim 1, wherein the copolymer is obtainable by copolymerizing
   from 20 to 50 mol % of a 1,2-di-$C_1$-$C_4$-alkoxyethylene,
   (b) from 20 to 55 mol % of a monoethylenically unsaturated dicarboxylic anhydride of from 4 to 8 carbon atoms and
   (c) from 5 to 60 mol % of a monoethylenically unsaturated $C_3$-$C_8$-monocarboxylic acid.

* * * * *